United States Patent
Park

(10) Patent No.: US 10,079,381 B2
(45) Date of Patent: Sep. 18, 2018

(54) RECHARGEABLE BATTERY PACK

(71) Applicant: Samsung SDI Co., Ltd., Yongin-si, Gyeonggi-do (KR)

(72) Inventor: Beom-Sik Park, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 243 days.

(21) Appl. No.: 14/616,570

(22) Filed: Feb. 6, 2015

(65) Prior Publication Data

US 2015/0228961 A1    Aug. 13, 2015

(30) Foreign Application Priority Data

Feb. 10, 2014  (KR) .................. 10-2014-0014934

(51) Int. Cl.
*H01M 8/16* (2006.01)
*H01M 2/34* (2006.01)
(Continued)

(52) U.S. Cl.
CPC .......... *H01M 2/34* (2013.01); *H01M 2/0417* (2013.01); *H01M 2/30* (2013.01); *H01M 2/348* (2013.01);
(Continued)

(58) Field of Classification Search
CPC ........ H01M 2/34; H01M 2/0417; H01M 2/30; H01M 2/348; H01M 2/36; H01M 2/0473;
(Continued)

(56) References Cited

U.S. PATENT DOCUMENTS

| 2008/0118820 A1* | 5/2008 | Jang ............... H01M 2/348 429/62 |
| 2008/0152997 A1* | 6/2008 | Lee ................ H01M 2/0413 429/174 |

(Continued)

FOREIGN PATENT DOCUMENTS

| KR | 10-2009-0064028 (A) | 6/2009 |
| KR | 10-1132166 (B1) | 3/2012 |

OTHER PUBLICATIONS

Extended European Search Report dated Apr. 23, 2015 in European Application No. 15151514.5.

(Continued)

*Primary Examiner* — Raymond Alejandro
(74) *Attorney, Agent, or Firm* — Knobbe Martens Olson & Bear LLP

(57) ABSTRACT

A rechargeable battery pack according to an exemplary embodiment of the present invention includes: a battery cell for being charged and discharged; an electrode terminal provided in a cap plate of the battery cell; a protection member disposed above and spaced apart from the cap plate, having one lateral end electrically connected to the electrode terminal, and electrically protecting the battery cell; and a protective circuit module disposed above and spaced apart from the protection member and electrically connected to the other lateral end of the protection member. The other lateral end of the protection member integrally extends to correspond to a connection portion of the protective circuit module.

20 Claims, 6 Drawing Sheets

(51) Int. Cl.
*H01M 2/04* (2006.01)
*H01M 10/42* (2006.01)
*H01M 2/30* (2006.01)
*H01M 2/36* (2006.01)
*H01M 10/04* (2006.01)

(52) U.S. Cl.
CPC ...... *H01M 10/4257* (2013.01); *H01M 2/0473* (2013.01); *H01M 2/36* (2013.01); *H01M 10/0431* (2013.01); *H01M 2200/00* (2013.01); *H01M 2200/106* (2013.01); *H01M 2220/20* (2013.01); *H01M 2220/30* (2013.01)

(58) Field of Classification Search
CPC ......... H01M 10/4257; H01M 10/0431; H01M 2200/106; H01M 2200/20; H01M 2200/30
See application file for complete search history.

(56) References Cited

U.S. PATENT DOCUMENTS

| | | | |
|---|---|---|---|
| 2011/0039129 A1 | 2/2011 | Lee et al. | |
| 2011/0159323 A1* | 6/2011 | Kim | H01M 2/30 429/7 |
| 2012/0129014 A1 | 5/2012 | Baek et al. | |
| 2013/0260203 A1* | 10/2013 | Yoshida | H01M 2/22 429/94 |

OTHER PUBLICATIONS

Office Action dated Jan. 3, 2018 for European Patent Application No. 15151514.5.

\* cited by examiner

RECHARGEABLE BATTERY PACK

INCORPORATION BY REFERENCE TO ANY PRIORITY APPLICATIONS

This application claims priority to and the benefit of Korean Patent Application No. 10-2014-0014934 filed in the Korean Intellectual Property Office on Feb. 10, 2014, the entire contents of which are incorporated herein by reference.

BACKGROUND OF THE INVENTION

Field of the Invention

The described technology relates generally to a rechargeable battery pack having a configuration in which a battery cell is connected to a protective circuit module.

Description of the Related Art

A rechargeable battery differs from a primary battery in that it can be repeatedly charged and discharged, while the latter is incapable of being recharged.

A low-capacity rechargeable battery is used in small portable electronic devices such as mobile phones, notebook computers, and camcorders, while a high-capacity rechargeable battery can be widely used as a power source for driving a motor of an electric bike, a scooter, an electric vehicle, a fork lift, etc.

Depending on device types using the rechargeable battery, the rechargeable battery may be used as a battery cell or a pack combining a plurality of battery cells.

A typical rechargeable battery pack includes one or more battery cells, a protection circuit module (PCM) that is connected to one or more electrode terminals so as to protect the battery cells, and a protection element for connecting the electrode terminals and the PCM. The PCM is configured to prevent overcharge, over-discharge, overcurrent, and short-circuit of the battery cell.

Further, the protection element is provided between the PCM and the electrode terminal, and may be a resistive element having a positive temperature coefficient (PTC).

As an example of a resistive element, a thermal-cutoff (TCO) element electrically disconnects the electrode terminal from the PCM if the temperature of the battery cell reaches a predetermined risk level, and electrically reconnects them if the temperature reaches a predetermined safe level.

The rechargeable battery pack is provided with a top case between the battery cell and the PCM, and the top case has a bottom surface combined with the battery cell at one side and a top surface supporting a nickel plate at the other side. That is, the TCO is bent after being inserted from the bottom surface of the top case to the top surface thereof.

An outer terminal of the TCO is welded to the nickel plate on the top surface of the top case, and an inner terminal of the TCO is welded to the electrode terminal of the battery cell. Accordingly, a number of parts and thus a number of processes are increased when connecting the TCO to the battery cell, thereby deteriorating productivity. Further, the top case should be manufactured by insert molding the nickel plate, thereby increasing parts cost.

The above information disclosed in this Background section is only for enhancement of understanding of the background of the described technology and therefore it may contain information that does not form the prior art that is already known in this country to a person of ordinary skill in the art.

SUMMARY OF THE INVENTION

One exemplary embodiment provides a battery pack with improved productivity by reducing a number of parts and work processes when a battery cell is connected to a protective circuit module.

Another exemplary embodiment provides a battery pack that is competitive in price by lowering parts cost.

A rechargeable battery pack according to an exemplary embodiment includes: a battery cell for being charged and discharged; an electrode terminal provided in a cap plate of the battery cell; a protection member disposed above and spaced apart from the cap plate, having one lateral end electrically connected to the electrode terminal, and electrically protecting the battery cell; and a protective circuit module disposed above and spaced apart from the protection member and electrically connected to the other lateral end of the protection member. The other lateral end of the protection member integrally extends to correspond to a connection portion of the protective circuit module.

The one lateral end of the protection member may form a first welding portion that is welded to the electrode terminal, and the other lateral end of the protection member may form a second welding portion that is connected to the connection portion of the protective circuit module.

The protection member may further include a protection element that is connected to the first and second welding portions in a first direction.

The first and second welding portions may be sequentially disposed at one side of the electrode terminal in the first direction.

The rechargeable battery pack according to the exemplary embodiment may further include an insulating tape disposed at an inner side of the protective circuit module in a second direction that crosses the first direction while covering the protection member and the first welding portion.

The rechargeable battery pack according to the exemplary embodiment may further include a top case that is disposed between the cap plate and the protection member in the second direction while being formed as an insulator.

The rechargeable battery pack according to the exemplary embodiment may further include a double-sided adhesive tape interposed between the top case and the protection member.

The top case may form an opened portion that corresponds to at least the electrode terminal and the protection element, and the protection element may be placed in the opened portion while being spaced apart from an inner side thereof.

The protection member may be formed to have a second thickness smaller than a first thickness of the opened portion that is set in the second direction.

The first and second welding portions may be sequentially disposed at one side of the protection element in the first direction.

The protection member may be further provided with a current path portion that connects the protection element and the second welding portion.

The current path portion may be disposed at both lateral sides of the protection element in a third direction that crosses the first direction.

The top case may include a first coupling protrusion that protrudes in the second direction to be combined to the protection member's side in the first direction, and a second coupling protrusion that protrudes in the second direction to be combined to the second welding portion at an opposite side of the first coupling protrusion in the first direction.

The current path portion may be disposed at one side of the protection element in a third direction that crosses the first direction.

The first and second welding portions may be respectively disposed at both lateral sides of the protection element in the first direction.

The second welding portion may be directly connected to the protection element

The top case may include a coupling protrusion that protrudes in a second direction crossing the first direction so as to be combined with the protection element and the second welding portion therebetween in the first direction.

The second welding portion may be formed to have a third thickness smaller than a first thickness of the opened portion that is set in the second direction.

The second welding portion may form a top surface having the same level as that of an opened portion that is set in the second direction.

The second welding portion may be formed to have a fourth thickness, which is the same thickness between one side surface of the protection element that is set in the second direction and a surface of the top case.

As such, according to the exemplary embodiment, since the electrode terminal and the connection portion of the protective circuit module are respectively connected to one end and the other end of the protection member, a number of parts and work processes are reduced, thereby improving productivity.

Thus, the exemplary embodiment may lower the parts cost to be competitive in price.

That is, according to the exemplary embodiment, since the protection element and the first and second welding portions are integrally formed to form the protection member, the first welding portion provided at both lateral sides of the protection member may connected to the electrode terminal while the second welding portion may be connected to the connection portion of the protective circuit module.

Accordingly, the number of parts around the protection element and work processes may be reduced when connecting the battery cell to the protective circuit module, thereby improving the productivity.

DETAILED DESCRIPTION OF THE PREFERRED EMBODIMENT

Figure 1:
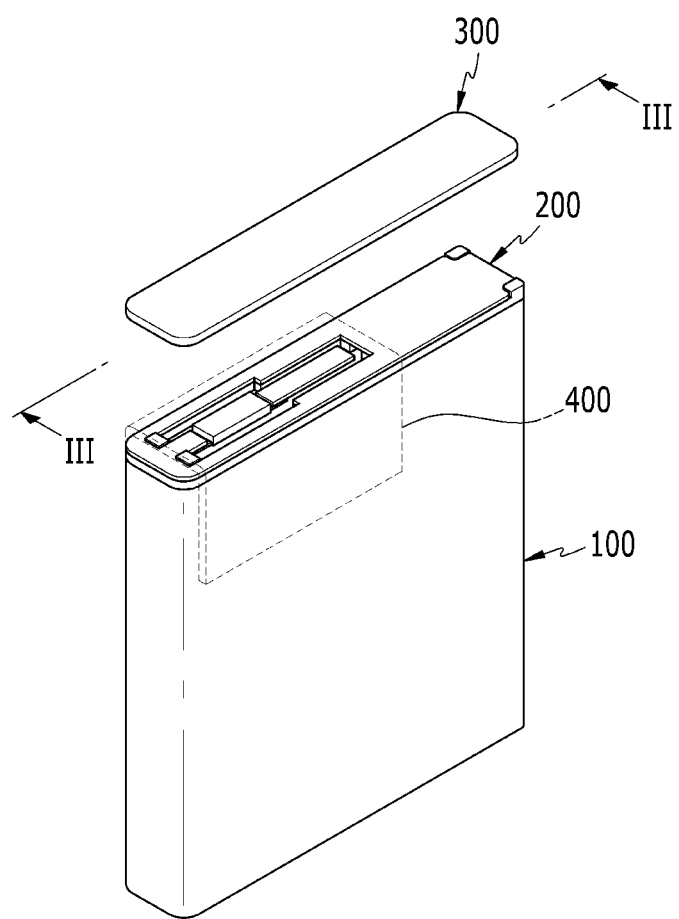
FIG. 1 is a perspective view of a rechargeable battery pack according to a first exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

Figure 2:
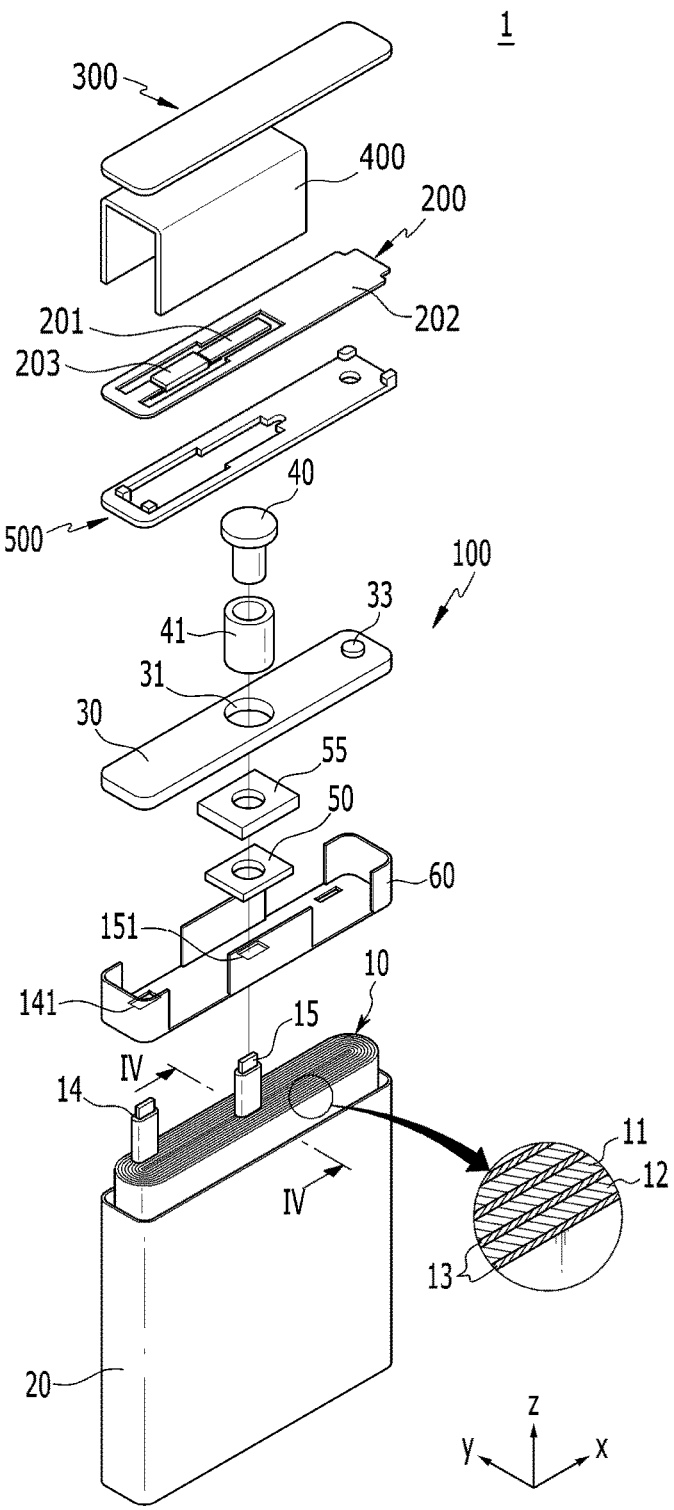
FIG. 2 is an exploded perspective view of the rechargeable battery pack shown in FIG. 1.

FIG. 1 is a perspective view of a rechargeable battery pack according to a first exemplary embodiment of the present invention, and FIG. 2 is an exploded perspective view of the rechargeable battery pack shown in FIG. 1.

Referring to FIGS. 1 and 2, the rechargeable battery pack 1 according to the first exemplary embodiment includes a battery cell 100 for performing charging and discharging, a protection member 200 electrically connected to an electrode terminal 40 of the battery cell 100, and a protective circuit module 300 electrically connected to the protection member 200.

The electrode terminal 40 is provided in a cap plate 30 of the battery cell 100. The protection member 200 is formed to electrically protect the battery cell 100 such that it is disposed above and spaced apart from the cap plate 30 with one lateral end electrically connected to the electrode terminal 40. For example, when charging and discharging, the protection member 200 is set to electrically disconnect the battery cell 100 from the protective circuit module 300 if the temperature of the battery cell 100 exceeds a predetermined value.

The protective circuit module 300 is disposed above and spaced apart from the protection member 200, and is electrically connected to the other lateral end of the protection member 200. In this case, the other lateral end of the protection member 200 is integrally formed such that it extends to correspond to a connection portion W of the protective circuit module 300.

The protective circuit module 300 forms an electrical circuit to prevent overcharge, over-discharge, overcurrent, and short-circuit of the battery cell 100, and is provided with various circuit elements.

Figure 3:
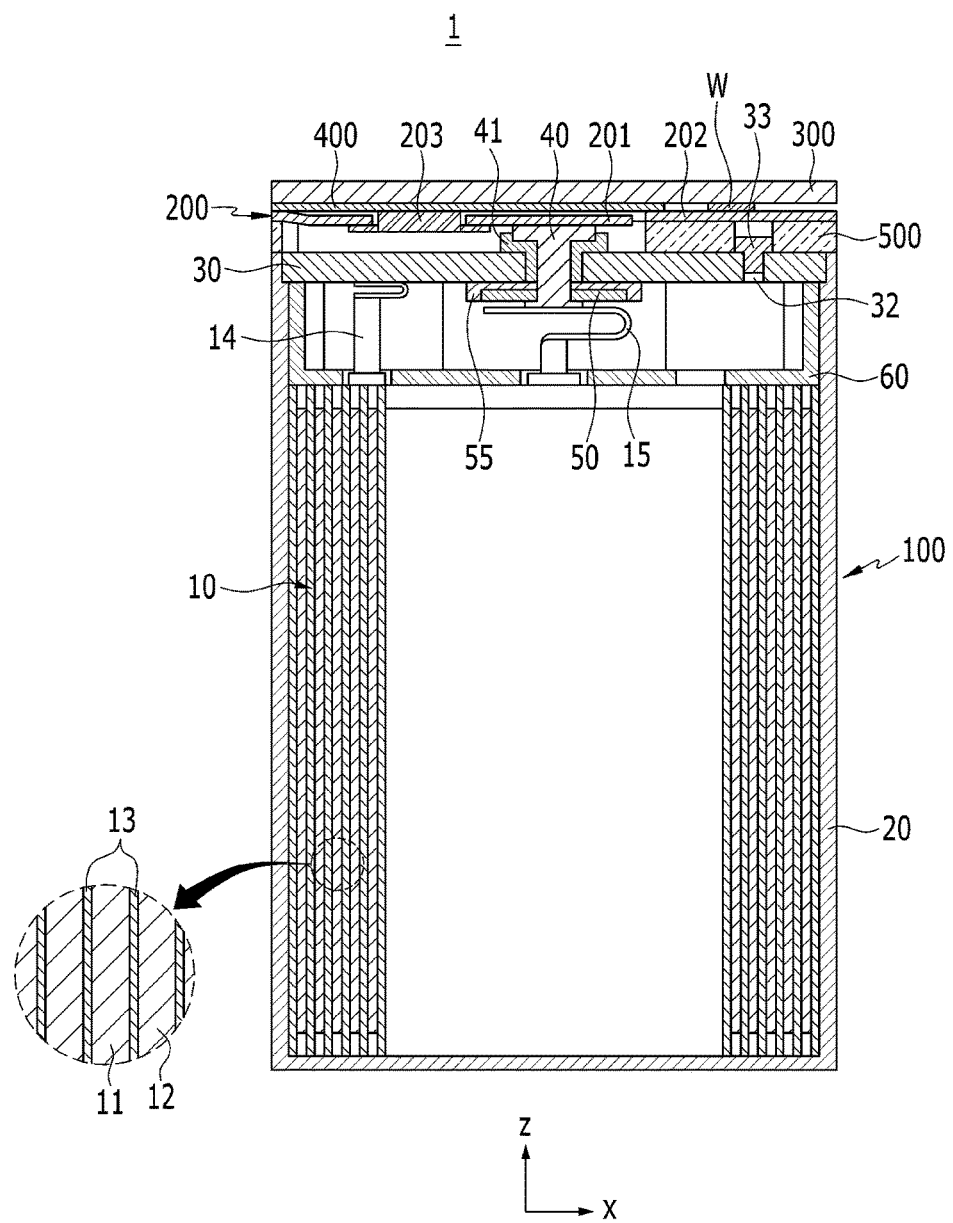
FIG. 3 is a cross-sectional view of FIG. 1 taken along the line III-III

FIG. 3 is a cross-sectional view of FIG. 1 taken along the line III-III.

Referring to FIGS. 2 and 3, the battery cell 100 includes an electrode assembly 10 for charging and discharging a current, a case 20 for accommodating the electrode assembly 10 along with an electrolyte solution, the cap plate 30 for sealing an opening of the case 20, and the electrode terminal 40 provided in a terminal hole 31 so as to be electrically connected to the electrode assembly 10.

The battery cell 100 further includes a terminal plate 50 that electrically connects the electrode terminal 40 to the electrode assembly 10, and an insulating case 60 that is provided between the cap plate 30 and the electrode assembly 10. The electrode assembly 10 has a shape corresponding to the internal space of the case 20 such that it can be inserted into the case 20. The electrode assembly 10 is formed by spirally winding a positive electrode 11 and a negative electrode 12 in a jelly roll form while a separator 13 is interposed therebetween as an insulator.

The electrode assembly 10 is provided with a positive electrode lead tab 14 that is connected to the positive electrode 11, and a negative electrode lead tab 15 that is connected to the negative electrode 12. The positive electrode lead tab 14 is connected to a bottom surface of the cap plate 30 by welding, and the case 20 is electrically connected to the positive electrode 11 of the electrode assembly 10 through the cap plate 30 so as to function as a positive terminal.

The negative electrode lead tab 15 is connected by welding to a bottom surface of the terminal plate 50 that is connected to one end of the electrode terminal 40, and the electrode terminal 40 provided in the terminal hole 31 of the cap plate 30 is electrically connected to the negative electrode 12 of the electrode assembly 10 so as to function as a negative terminal.

Though not illustrated, the negative electrode lead tab may be connected to the cap plate so as to function as the negative terminal, while the positive lead tab may be connected to the electrode terminal so as to function as the positive terminal.

As an example, the electrode terminal 40 is inserted into the terminal hole 31 of the cap plate 30 to be riveted while interposing an insulation gasket 41 therebetween. In this case, the insulating gasket 41 electrically insulates the terminal hole 31 and the electrode terminal 40, and forms a sealing structure between the terminal hole 31 and the electrode terminal 40. The terminal plate 50 is electrically connected to the electrode terminal 40 while interposing an insulating plate 55 therebetween. That is, the insulating plate 55 electrically insulates the cap plate 30 from the terminal plate 50, and further forms a sealing structure between the cap plate 30 and the terminal plate 50.

The case 20 allows insertion of the electrode assembly 10 and the insulating case 60 into the opening that is provided in its upper part. Further, the case 20 is formed as a conductor such that it accommodates the electrode assembly 10 along with the cap plate 30 and function as the electrode terminal 40. For example, the case 20 may be made of aluminum or an aluminum alloy.

The insulating case 60 is provided between the electrode assembly 10 and the terminal plate 50 inside the case 20 such that it electrically insulates the terminal electrode 10 from the terminal plate 50. That is, the insulating case 60 electrically insulates the positive electrode 11 of the electrode assembly 10 from the terminal plate 50 having negative polarity. Further, the insulating case 60 is provided with tab holes 141 and 151 through which the positive and negative lead tabs 14 and 15 penetrate.

Accordingly, the positive electrode lead tab 14 may penetrate through the tab hole 141 to be connected to the cap plate 30, while the negative electrode lead tab 15 may penetrate through the tab hole 151 to be connected to the terminal plate 50.

The cap plate 30 is further provided with an electrolyte injection opening 32. The electrolyte injection opening 32 allows injection of the electrolyte solution into the case 20 after the case 20 and the cap plate 30 are combined and welded together. The electrolyte injection opening 32 is sealed with a sealing cap 33 after the injection of the electrolyte solution.

The protection member 200 includes a protection element 203, and a first welding portion 201 and a second welding portion 202 that are connected to the protection element 203. As an example, the protection element 203 may be a resistive element having a positive temperature coefficient (PTC).

As an example, one end of the protection member 200 forms the first welding portion 201 that is welded to the electrode terminal 40, while the other end forms the second welding portion 202 that is connected to the connection portion W of the protective circuit module 300. The one end and the other end of the protection member 200 may form a bonding portion or a connection portion that respectively forms a conductive structure. The integrally formed protection member 200 may reduce the number of parts and work processes when connecting the battery cell 100 and the protective circuit module 300, thereby improving productivity. Thus, the rechargeable battery pack 1 according to the first exemplary embodiment may lower parts cost to be competitive in price.

That is, when the battery cell 100 is electrically connected to the protective circuit module 300, the number of parts around the protection element 203 is reduced, and thus the number of work processes can be reduced when assembling the rechargeable battery pack 1. Accordingly, the productivity may be improved.

Figure 4:
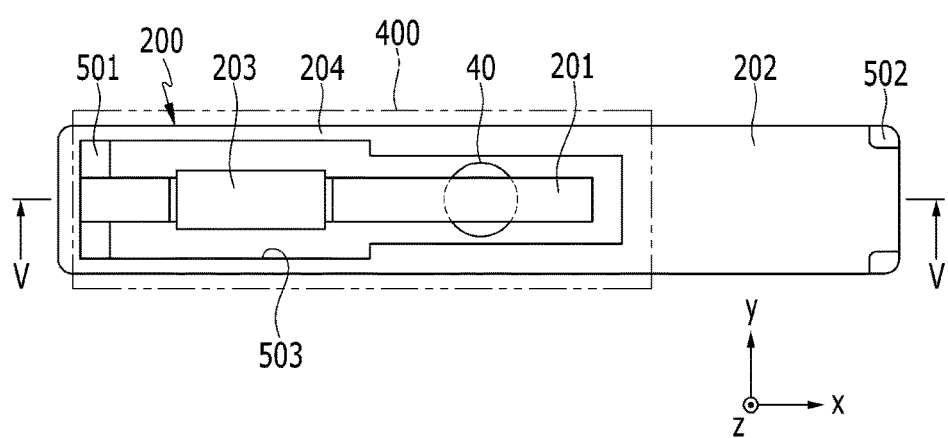
FIG. 4 is a top plan view of a protection member and a top case that are illustrated in FIG. 3.
Figure 5:
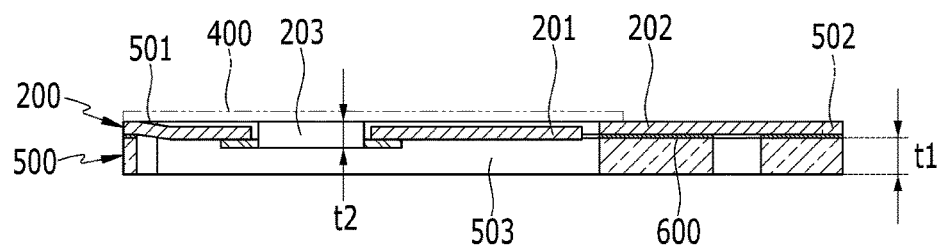
FIG. 5 is a cross-sectional view of FIG. 4 taken along the line V-V.

FIG. 4 is a top plan view of the protection member and a top case that are illustrated in FIG. 3, and FIG. 5 is a cross-sectional view of FIG. 4 taken along the line V-V.

Referring to FIGS. 2 to 5, as an example, the first welding portion 201 is welded to the electrode terminal 40 to be electrically connected thereto, while the second welding portion 202 is welded to the connection portion W of the protective circuit module 300 (refer to FIG. 3) to be electrically connected thereto.

The second welding portion 202 is connected to an opposite side of the first welding portion 201 of the protection element 203 in a first direction (x-axis direction) such that it is finally connected to the connection portion W of the protective circuit module 300.

Further, the first and second welding portions 201 and 202 are sequentially disposed at one end of the electrode terminal 40 in the first direction (x-axis direction).

The rechargeable battery pack 1 according to the first exemplary embodiment may further include an insulating tape 400 and a top case 500. The insulating tape 400 covers the protection member 200 and is disposed at an inner side of the protective circuit module 300 in a second direction (z-axis direction) that crosses the first direction, such that it prevents an unnecessary short-circuit between the protection member 200 and the protective circuit module 300. That is, the insulating tape 400 covers the protection element 203 and the first welding portion 201 such that it prevents the protection element 203 or the first welding portion 201 from being short-circuited with the protective circuit module 300. Further, by exposing the second welding portion 202, the insulating tape 400 allows a connection of the connection portion W of the protective circuit module 300 to the second welding portion 202 through welding.

The top case 500 is formed of an insulating material and is disposed between the cap plate 30 and the protection member 200 in the second direction (z-axis direction), such that it prevents the protection member 200 connected to the electrode terminal 40 from being short-circuited with the cap plate 30.

The rechargeable battery pack 1 according to the first exemplary embodiment further includes a double-sided adhesive tape 600 that is interposed between the top case 500 and the protection member 200 (for convenience, illustrated only in FIG. 5).

A structure in which the double-sided adhesive tape 600 easily attaches the protection member 200 to the top case 500 not only lowers a manufacturing cost for the protection member 200 and the top case 500 but also allows ease of assembly of the protection member 200 and the top case 500 compared with an insert-molded structure.

The top case 500 is formed with an opened portion 503 that corresponds to at least the electrode terminal 40 and the protection element 203.

In the first exemplary embodiment, the opened portion 503 is formed to correspond to the first welding portion 201 and the protection element 203, and further to some of the second welding portion 202. Further, the protection element 203 is formed to have a second thickness t2 that is smaller than a first thickness t1 of the opened portion 503 set in the second direction (z-axis direction). Thus, the protection element 203 is placed in the opened portion 503 while spaced apart from an inner wall of the opened portion 503. That is, the protection element 203 is placed in a space that is set by the cap plate 30, the opened portion 503, and the insulating tape 400.

In the protection member 200, the first and second welding portions 201 and 202 are sequentially disposed at one side of the protection element 203 in the first direction (x-axis direction). Thus, welding between the first and second welding portions 201 and 202 can be easily performed.

That is, the first welding portion 201 is connected to the electrode terminal 40 at one side of the protection element 203, while the second welding portion 202 is connected to the connection portion W of the protective circuit module 300 at one side of the first welding portion 201. The protection member 200 further includes a current path portion 204 for interconnecting the protection element 203 and the second welding portion 202. The current path portion 204 connects one side of the protection element 203 to dispose the second welding portion 202 at one side of the first welding portion 201. Further, the current path portion 204 is disposed at both lateral sides of the protection element 203 in a third direction (y-axis direction) that crosses the first direction (x-axis direction).

Thus, the current path portion 204 enables stable current flow from the opposite side of the first welding portion 201 of the protection element 203 to the second welding portion 202.

The top case 500 includes a first coupling protrusion 501 and a second coupling protrusion 502 that protrude in the second direction (z-axis direction). The first coupling protrusion 501 is combined to the protection member 200 at one side of the protection element 203 in the first direction (x-axis direction), while the second coupling protrusion 502 is combined to the second welding portion 202 at an opposite side of the first coupling protrusion 501 in the first direction (x-axis direction). The protection member 200 is attached to the top case 500 in the z-axis direction while interposing the double-sided adhesive tape 600 therebetween, and is combined to the top case 500 in the x-axis and y-axis directions while interposing the first and second coupling protrusions 501 and 502 therebetween.

The double-sided adhesive tape 600 may be formed such that it corresponds to the protection member 200 and does not overlap the first and second coupling protrusions 501 and 502 at the same time. Thus, the protection member 200 and the top case 500 may stably maintain their adhesive and coupling forces between them.

Various exemplary embodiments will now be described. Compared with the configurations of the first exemplary embodiment and the aforementioned exemplary embodiment, a description of the same configurations will be omitted while different configurations will be described.

Figure 6:
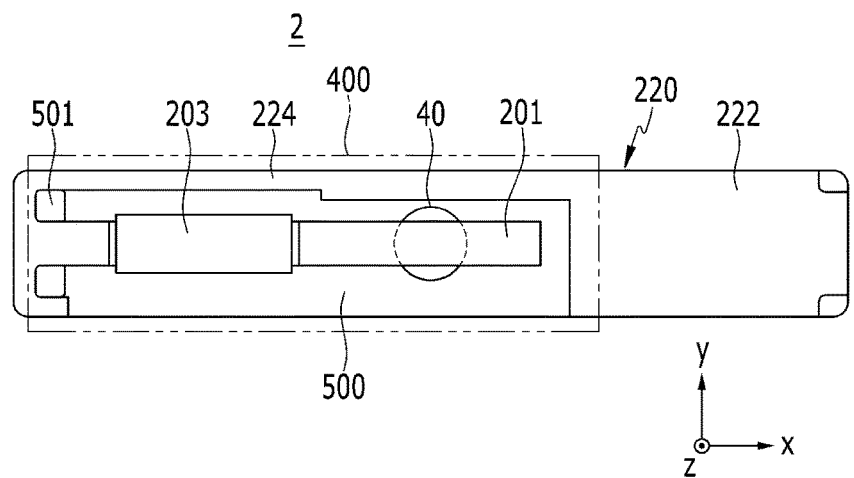
FIG. 6 is a top plan view of a protection member and a top case in a rechargeable battery pack according to a second exemplary embodiment of the present invention.

FIG. 6 is a top plan view of a protection member and a top case in a rechargeable battery pack according to a second exemplary embodiment of the present invention. Referring to FIG. 6, in the rechargeable battery pack 2 according to the second exemplary embodiment of the present invention, a current path portion 224 of a protection member 220 is positioned at one side of the protection element 203 in the third direction (y-axis direction) that crosses the first direction (x-axis direction). Thus, the current path portion 224 enables stable current flow from the opposite side of the first welding portion 201 of the protection element 203 to a second welding portion 222.

Figure 7:
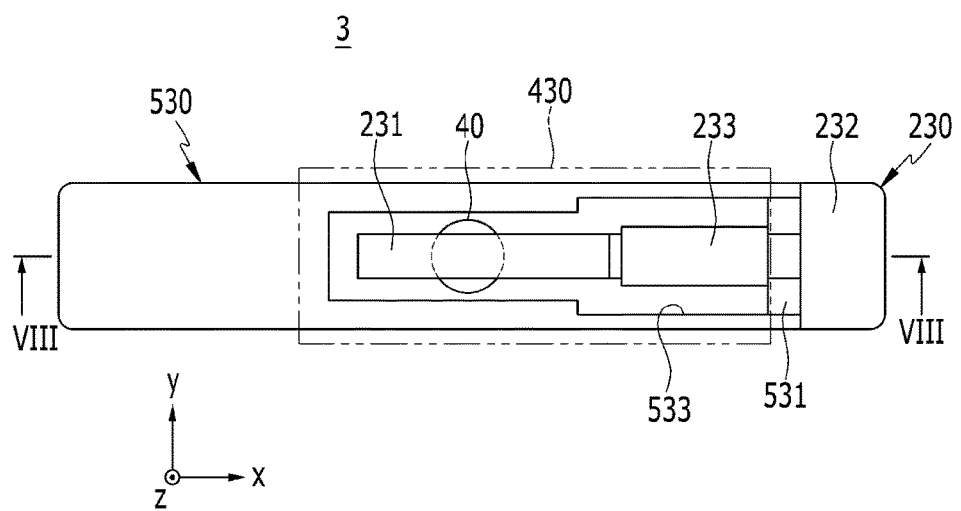
FIG. 7 is a top plan view of a protection member and a top case in a rechargeable battery pack according to a third exemplary embodiment of the present invention.
Figure 8:
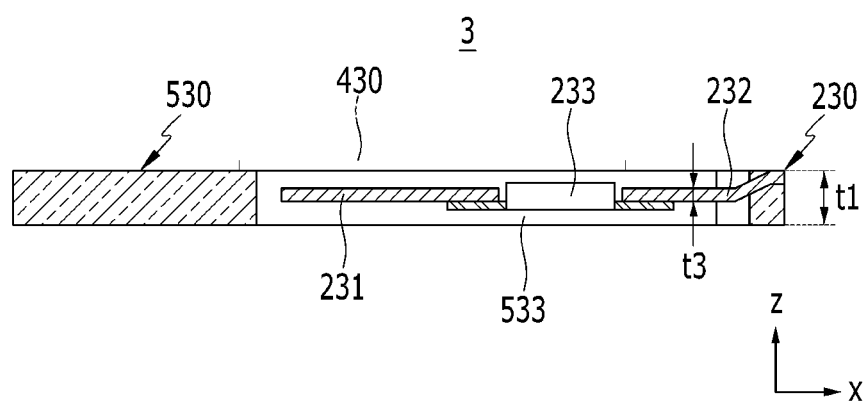
FIG. 8 is a cross-sectional view of FIG. 7 taken along the line VIII-VIII.

FIG. 7 is a top plan view of a protection member and a top case in a rechargeable battery pack according to a third exemplary embodiment of the present invention, and FIG. 8 is a cross-sectional view of FIG. 7 taken along the line VIII-VIII.

Referring to FIGS. 7 and 8, in the rechargeable battery pack 3 according to the third exemplary embodiment of the present invention, first and second welding portions 231 and 232 of a protection member 230 are respectively positioned at both lateral side of a protection element 233 in the first direction (x-axis direction). In the third exemplary embodiment, the second welding portion 232 is directly connected to the protection element 233.

That is, in the third exemplary embodiment, since the protection member 230 does not include a configuration that corresponds to the current path portions 204 and 224 of the first and second exemplary embodiments, the protection member 230 is formed to have a simpler structure than the protection members 200 and 220 of the first and second exemplary embodiments.

A top case 530 is provided with a coupling protrusion 531 that protrudes in the second direction (z-axis direction). The coupling protrusion 531 is formed to be combined with the protection element 233 and the second welding portion 232 therebetween in the first direction (x-axis direction). The second welding part 232 is formed to have a third thickness t3 that is smaller than a first thickness t1 of an opened portion 533 that is set in the second direction (z-axis direction).

The second welding portion 232 is connected to one side of the protection element 233 such that it is mounted on a surface of the top case 530 at one side of the opened portion 533. The first welding portion 231 and the protection element 233 are placed in the opened portion 533 while spaced apart from an inner wall thereof. That is, the protection element 233 is placed in a space that is set by the cap plate 30, the opened portion 533, and an insulating tape 430.

Figure 9:
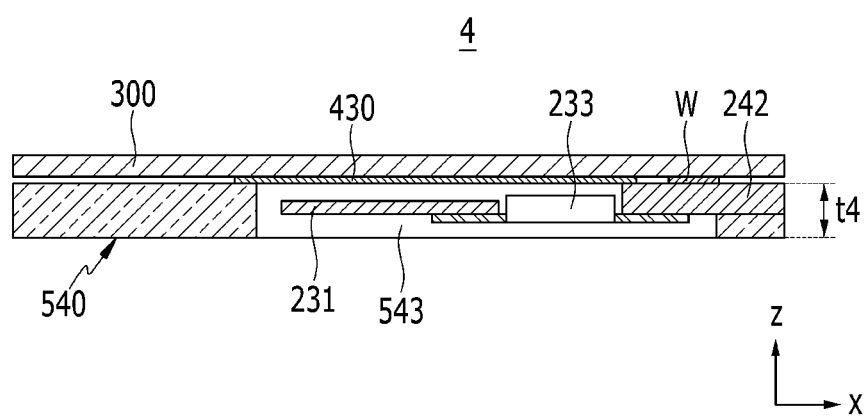
FIG. 9 is a top plan view of a protection member and a top case in a rechargeable battery pack according to a fourth exemplary embodiment of the present invention.

FIG. 9 is a top plan view of a protection member and a top case in a rechargeable battery pack according to a fourth exemplary embodiment of the present invention. Referring to FIG. 9, in the rechargeable battery pack 4 according to the fourth exemplary embodiment, a second welding portion 242 of a protection member 240 forms a top surface having the same level as that of an opened portion 543 that is set in the second direction (z-axis direction).

The second welding portion 242 is formed to have a fourth thickness t4, which is the same thickness between one side surface of the protection element 233 that is set in the second direction (z-axis direction) and a surface of a top case 540. The second welding portion 242 can be more stably connected to the connection portion W of the protective circuit module 300 as it is formed thicker to have the fourth thickness t4.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rechargeable battery pack comprising:
a battery cell for being charged and discharged;
an electrode terminal provided in a cap plate of the battery cell the cap plate defining side edges and first and second lateral end edges;
a protection member disposed above and spaced apart from the cap plate, having first and second lateral ends respectively adjacent the first and second lateral end edges of the cap plate and a first end that is electrically connected to the electrode terminal and is interposed between the first and second lateral ends, and electrically protecting the battery cell; and
a protective circuit module disposed above and spaced apart from the protection member and electrically connected to a second end of the protection member, wherein the second end of the protection member integrally extends from the first end to correspond to a connection portion of the protective circuit module;
wherein the protection member includes a protection element and wherein the first end of the protection member is coupled to the electrode terminal wherein the protection member defines an open space between two side walls of the protection member and between the first end of the protection member and a first lateral end of the protection element where the protection element is positioned within the open space and wherein the first lateral end of the protection member is connected to the second end of the protection member by current path portions that define side walls of the open space.

2. The rechargeable battery pack of claim 1, wherein the first end of the protection member forms a first welding portion that is welded to the electrode terminal, and the second end of the protection member forms a second welding portion that is connected to the connection portion of the protective circuit module.

3. The rechargeable battery pack of claim 1, wherein the protection member further includes the protection element that is connected to the first and second welding portions so as to be interposed between the first and second ends and extends in a first direction.

4. The rechargeable battery pack of claim 3, wherein the first and second welding portions are sequentially disposed at one side of the electrode terminal so as to extend in the first direction.

5. The rechargeable battery pack of claim 4, the insulating tape is disposed at an inner side of the protective circuit module in a second direction that crosses the first direction while covering the protection member and the first welding portion.

6. The rechargeable battery pack of claim 5, further comprising a top case that is disposed between the cap plate and the protection member in the second direction while being formed as an insulator.

7. The rechargeable battery pack of claim 6, further comprising a double-sided adhesive tape interposed between the top case and the protection member.

8. The rechargeable battery pack of claim 6, wherein the top case forms an opened portion that corresponds to at least the electrode terminal and the protection element, and the protection element is placed in the opened portion while being spaced apart from an inner side thereof.

9. The rechargeable battery packs of claim 8, wherein the protection member is formed to have a second thickness smaller than a first thickness of the opened portion that is set in the second direction.

10. The rechargeable battery pack of claim 9, wherein the first and second welding portions are sequentially disposed at one side of the protection element in the first direction.

11. The rechargeable battery pack of claim 10, wherein the protection member is further provided with a current path portion that connects the protection element and the second welding portion.

12. The rechargeable battery pack of claim 11, wherein the current path portion is disposed at both lateral sides of the protection element in a third direction that crosses the first direction.

13. The rechargeable battery pack of claim 12, wherein the top case includes: a first coupling protrusion that protrudes in the second direction to be combined to the protection member's side in the first direction; and a second coupling protrusion that protrudes in the second direction to be combined to the second welding portion at an opposite side of the first coupling protrusion in the first direction.

14. The rechargeable battery pack of claim 11, wherein the current path portion is disposed at one side of the protection element in a third direction that crosses the first direction.

15. The rechargeable battery pack of claim 9, wherein the first and second welding portions are respectively disposed at both lateral sides of the protection element in the first direction.

16. The rechargeable battery pack of claim 15, wherein the second welding portion is directly connected to the protection element.

17. The rechargeable battery pack of claim 16, wherein the top case includes a coupling protrusion that protrudes in a second direction crossing the first direction so as to be combined with the protection element and the second welding portion therebetween in the first direction.

18. The rechargeable battery pack of claim 17, wherein the second welding portion is formed to have a third thickness smaller than a first thickness of the opened portion that is set in the second direction.

19. The rechargeable battery pack of claim 17, wherein the second welding portion forms a top surface having the same level as that of an opened portion that is set in the second direction.

20. The rechargeable battery pack of claim 19, wherein the second welding portion is formed to have a fourth thickness, which is the same thickness between one side surface of the protection element that is set in the second direction and a surface of the top case.

* * * * *